US009796428B1

(12) United States Patent
Tamaddon-Dallal et al.

(10) Patent No.: US 9,796,428 B1
(45) Date of Patent: Oct. 24, 2017

(54) TELESCOPING RACK SYSTEM FOR A PICK UP TRUCK

(71) Applicants: Dorina Tamaddon-Dallal, Foothill Ranch, CA (US); Artin Tamaddon-Dallal, Foothill Ranch, CA (US); Saied Tamaddon-Dallal, Foothill Ranch, CA (US)

(72) Inventors: Dorina Tamaddon-Dallal, Foothill Ranch, CA (US); Artin Tamaddon-Dallal, Foothill Ranch, CA (US); Saied Tamaddon-Dallal, Foothill Ranch, CA (US)

(73) Assignees: Dorina Tamaddon-Dallal, Foothill Ranch, CA (US); Saied Tamaddon-Dallal, Foothill Ranch, CA (US); Artin Tamaddon-Dallal, Foothill Ranch, CA (US)

( * ) Notice: Subject to any disclaimer, the term of this patent is extended or adjusted under 35 U.S.C. 154(b) by 0 days.

(21) Appl. No.: 15/175,216

(22) Filed: Jun. 7, 2016

(51) Int. Cl.
*B60R 9/06* (2006.01)
*B60R 13/01* (2006.01)
*B62D 33/02* (2006.01)
*B60R 9/042* (2006.01)

(52) U.S. Cl.
CPC .......... *B62D 33/0207* (2013.01); *B60R 9/042* (2013.01)

(58) Field of Classification Search
CPC ........ B60R 9/06; B60R 2011/04; B60R 13/01
USPC ........................................ 224/405, 442, 488
See application file for complete search history.

(56) References Cited

U.S. PATENT DOCUMENTS

| 3,672,549 | A |   | 6/1972  | Chorey        |            |
|-----------|---|---|---------|---------------|------------|
| 3,734,110 | A |   | 5/1973  | Burns         |            |
| 3,765,713 | A | * | 10/1973 | Suitt         | B60R 9/00  |
|           |   |   |         |               | 224/309    |
| 3,917,094 | A |   | 11/1975 | Magneson      |            |
| 3,976,213 | A |   | 8/1976  | Ball          |            |
| 4,046,273 | A |   | 9/1977  | Hughes        |            |
| 4,058,243 | A |   | 11/1977 | Tappan        |            |
| 4,267,948 | A | * | 5/1981  | Lewis         | B60P 3/40  |
|           |   |   |         |               | 211/191    |
| 4,380,344 | A |   | 4/1983  | Abbott        |            |
| 4,412,635 | A |   | 11/1983 | Bateman       |            |
| 4,630,990 | A | * | 12/1986 | Whiting       | B60R 9/042 |
|           |   |   |         |               | 224/310    |
| 4,682,719 | A |   | 7/1987  | Ernst et al.  |            |
| 4,728,244 | A |   | 3/1988  | Stokkendal    |            |
| 4,953,757 | A | * | 9/1990  | Stevens       | B60P 3/1025|
|           |   |   |         |               | 224/310    |
| 4,957,400 | A | * | 9/1990  | Karp          | B60R 9/04  |
|           |   |   |         |               | 224/309    |
| 5,143,415 | A |   | 9/1992  | Boudah        |            |
| 5,152,570 | A | * | 10/1992 | Hood          | B60R 9/00  |
|           |   |   |         |               | 296/3      |

(Continued)

*Primary Examiner* — Brian D Nash
(74) *Attorney, Agent, or Firm* — Michael Shimokaji; Shimokaji IP

(57) ABSTRACT

A material supporting system for a pick-up truck includes a platform with side members oriented parallel to one another; and cross-members interposed between the slide members. The system also includes support legs, first tracks, second tracks and roller assemblies. One of the roller assemblies is attached to a first end of one of the slide members. One of the support legs is attached to a second end, opposite the first end, of said slide member; and one of the roller assemblies is attached to said support leg.

11 Claims, 4 Drawing Sheets

(56) References Cited

U.S. PATENT DOCUMENTS

| | | | |
|---|---|---|---|
| 5,228,607 A | 7/1993 | Tolsdorf | |
| 5,454,496 A | 10/1995 | Sumida, Jr. | |
| 5,458,389 A | 10/1995 | Young | |
| 5,469,933 A | 11/1995 | Thomason | |
| 5,615,813 A | 4/1997 | Ouellette | |
| 5,632,591 A | 5/1997 | Henriquez | |
| 5,649,656 A | 7/1997 | Davy | |
| 5,678,743 A | 10/1997 | Johnson | |
| 5,685,686 A | 11/1997 | Burns | |
| 5,752,639 A | 5/1998 | Rice | |
| 5,788,135 A | 8/1998 | Janek | |
| 5,884,824 A | 3/1999 | Spring, Jr. | |
| 6,129,371 A | 10/2000 | Powell | |
| 6,139,247 A | 10/2000 | Wright | |
| 6,279,801 B1 | 8/2001 | Harrison | |
| 6,296,290 B1 | 10/2001 | Wolf | |
| 6,315,181 B1 | 11/2001 | Bradley et al. | |
| 6,511,088 B2 | 1/2003 | Kahlstorf | |
| 6,662,983 B2 | 12/2003 | Lane | |
| 6,729,513 B2 | 5/2004 | Kmita et al. | |
| 7,296,837 B2 | 11/2007 | Niedziela et al. | |
| 7,753,425 B2 | 7/2010 | Niedziela et al. | |
| 7,913,885 B2 * | 3/2011 | Long | B60P 3/40 182/127 |
| 7,914,064 B2 * | 3/2011 | Joab | B60J 1/1884 296/100.03 |
| 7,946,457 B2 | 5/2011 | Kramer | |
| 8,016,172 B1 | 9/2011 | Mefford | |
| 8,191,952 B2 * | 6/2012 | Mokhtari | B60P 3/42 224/405 |
| 8,474,896 B2 | 7/2013 | Ostberg | |
| 8,777,074 B2 | 7/2014 | Demers et al. | |
| 8,833,621 B2 * | 9/2014 | Burkhardt | B60P 3/40 224/403 |
| 9,156,411 B2 * | 10/2015 | Elezaj | B60R 9/0423 |
| 9,302,608 B1 * | 4/2016 | Tamaddon-Dallal | B60P 7/135 |
| 2003/0164621 A1 | 9/2003 | Krause | |
| 2005/0023314 A1 | 2/2005 | Williams | |
| 2007/0221444 A1 * | 9/2007 | Sutton | B60R 9/00 182/127 |
| 2009/0166390 A1 * | 7/2009 | Flaherty | B60P 3/40 224/405 |
| 2013/0291362 A1 * | 11/2013 | Sutton | B60R 11/00 29/428 |
| 2014/0239025 A1 * | 8/2014 | Scott | B60P 3/40 224/405 |
| 2016/0159290 A1 * | 6/2016 | Tamaddon-Dallal | B60R 9/045 224/402 |

* cited by examiner

TELESCOPING RACK SYSTEM FOR A PICK UP TRUCK

BACKGROUND OF THE INVENTION

The present invention relates to racks that provide support above a bed of a pick-up truck, and more particularly, to racks which can be readily placed or removed from a position above the bed of the pick-up truck.

A typical pick-up truck may be used to carry various types of materials. Some materials may fit entirely within a bed of the truck while other materials, e.g., lumber or ladders, may have lengths greater than the inside dimensions of the bed. When a truck is used to routinely carry such long-length loads, the truck may be modified by installation of a permanent over-the-bed rack.

While installation of a permanent over-the-bed rack may provide load carrying advantages for long-length loads, such a rack may diminish overall load carrying flexibility of the truck. For example, a permanently installed rack may preclude use of the truck to carry tall items such as a refrigerator or piece of furniture because such items may not fit under the permanently installed rack.

In some prior art instances, temporary rack systems have been designed to provide long-load carrying capability. Such temporary rack systems often require assembly or repositioning of various components prior to each use of the rack system. The components may need to be stored either on a truck or is some remote location when they are not in use. Deployment of such prior-art rack systems may be difficult if the components are stored on an exterior of the truck and subject to weather-induced deterioration.

As can be seen, there is a need for a system that may provide a pick-up truck with carrying capability for long-length material. More particularly, there is a need for such a system that will not diminish flexibility of cargo carrying capability of the pick-up truck. Still further, there is a need for such a system which may not be adversely effected by weather-induced deterioration and may be easily deployed when needed.

SUMMARY OF THE INVENTION

In one aspect of the present invention, an extendable rack system for a vehicle comprises: a rack assembly having a first supporting roller and a second supporting roller; a first track configured to be mounted on a roof of the vehicle; and a second track configured to be mounted on a side wall of a bed of the vehicle, wherein the first supporting roller is positioned for engagement with the first track after the first track is mounted on the roof, and wherein the second supporting roller is positioned for engagement with the second track after the second track is mounted on the side wall.

In another aspect of the present invention, a material supporting system for a pick-up truck comprises: a platform which includes; side members oriented parallel to one another; and cross-members interposed between the slide members; first roller assemblies attached to first ends of the side members; support legs attached to second ends, opposite the first ends, of the side members; second roller assemblies attached to the support legs; first tracks for mounting on a roof of the pick-up truck and for supporting the first roller assemblies; and second tracks for mounting on side walls of a bed of the pick-up truck and for supporting the second roller assemblies.

In still another aspect of the present invention, apparatus for locking a slidable pick-up truck rack in a desired position comprises: a track with locking holes spaced equidistantly along its length; a roller assembly having a roller bracket with locking holes, corresponding in shape and spacing to any pair of adjacent ones of the locking holes of the track; and a locking device having two legs, wherein the legs are shaped and spaced apart from one another to fit through the locking holes of the roller bracket and into any two adjacent ones of the locking holes of the track.

These and other features, aspects and advantages of the present invention will become better understood with reference to the following drawings, description and claims.

DETAILED DESCRIPTION OF THE INVENTION

The following detailed description is of the best currently contemplated modes of carrying out the invention. The description is not to be taken in a limiting sense, but is made merely for the purpose of illustrating the general principles of the invention, since the scope of the invention is best defined by the appended claims.

Various inventive features are described below that can each be used independently of one another or in combination with other features.

The present invention generally provides a telescoping, over-the-bed, rack system for a pick-up truck which may be extended over the bed when needed and retracted from the bed when not in use. The rack system may be easily deployed when needed.

Figure 1:
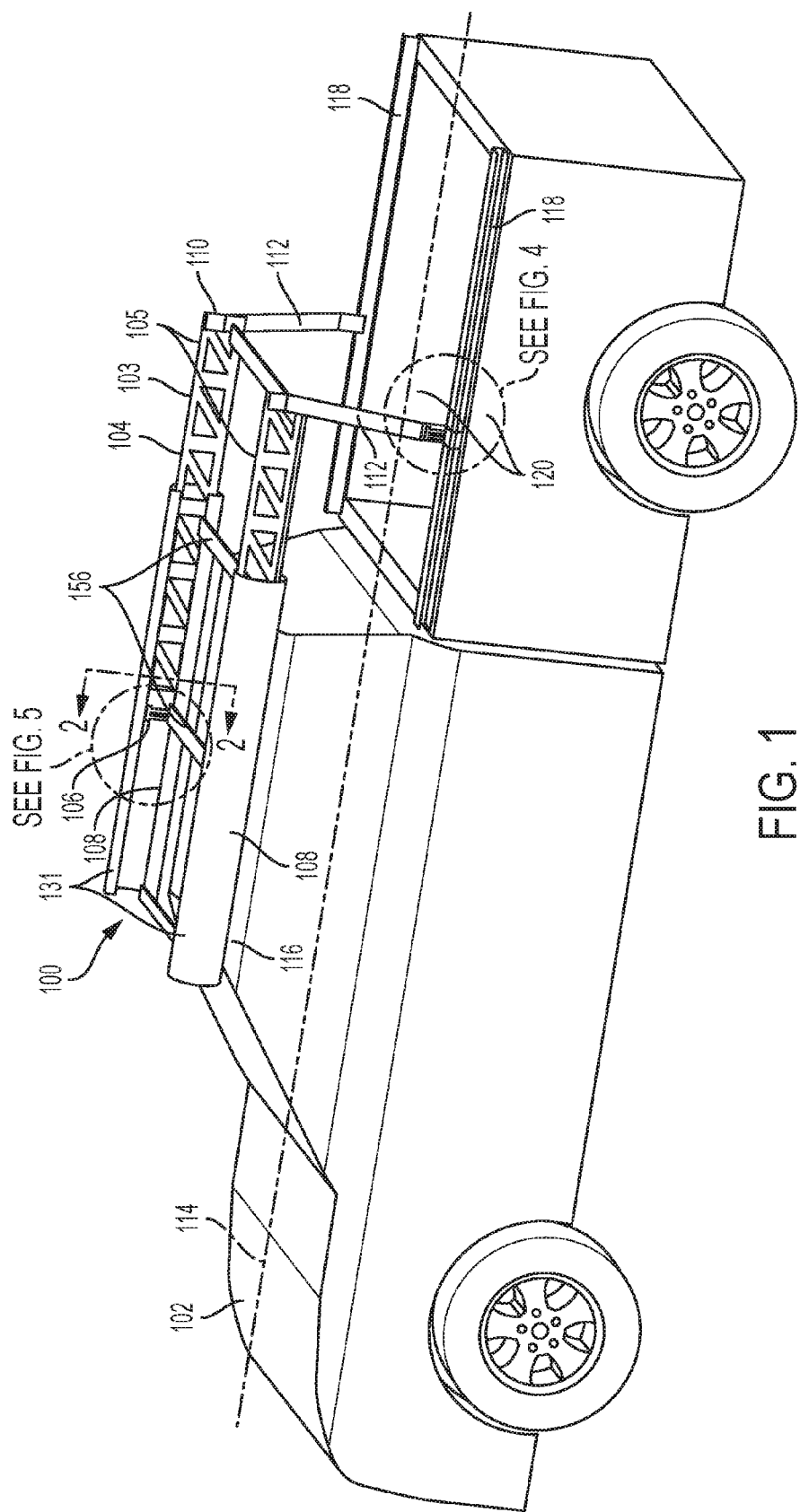
FIG. 1 is a perspective view of a material support system for a vehicle in accordance with an exemplary embodiment of the invention.

Turning now to the description and with reference first to FIG. 1, a vehicle such as a pick-up truck 102 may be equipped with an exemplary embodiment of a material support system 100. In general, the material support system 100 may include a slidable rack assembly 104 connected with the one or more support elements.

More specifically, the material support system 100 may be considered to be an extendable rack system 100. In an exemplary embodiment of the system 100, the slidable rack assembly 104 may be supported at its front end 106 on tracks 108 positioned on a roof 116 of the truck 102. The rack assembly 104 may be supported at its rear end 110 on support legs 112. The support legs 112 may be supported on tracks 118 positioned on side walls 120 of a bed of the truck 102.

A platform 103 of the slidable rack assembly 104 may be positionable above a roof 116 of the truck 102 or above an un-roofed portion of the truck 102 while remaining connected with the tracks 108. The platform 103 may include two side members 105 and two or more cross members 156. The side members 105 may be oriented substantially parallel to the roof 116 of the truck 102 and substantially parallel to a longitudinal axis 114 of the truck. The cross members 156 may be oriented substantially orthogonally to the side member 105. The tracks 108 may be aligned with the longitudinal axis 114 of the truck 102 and may be attached to the roof 116 of the truck 102.

Figure 2:
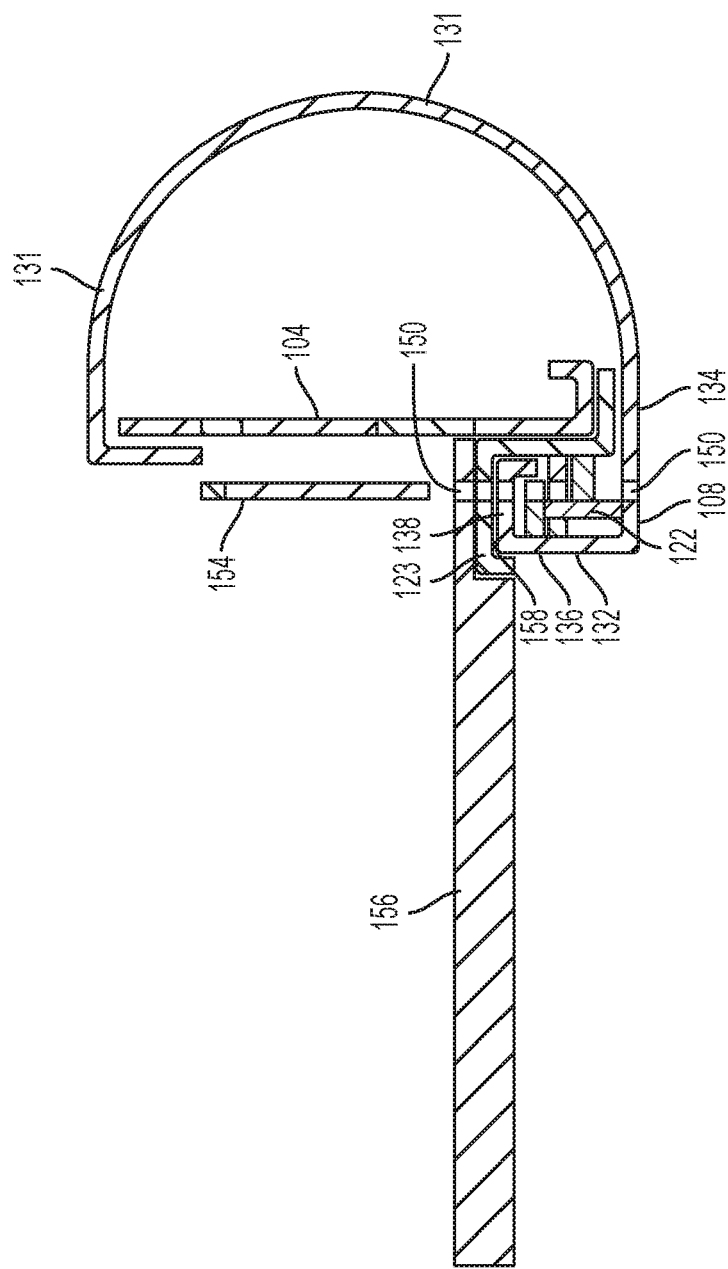
FIG. 2 is a cross-sectional view of the system of FIG. 1 taken along the line 2-2 in accordance with an exemplary embodiment of the invention.
Figure 3:
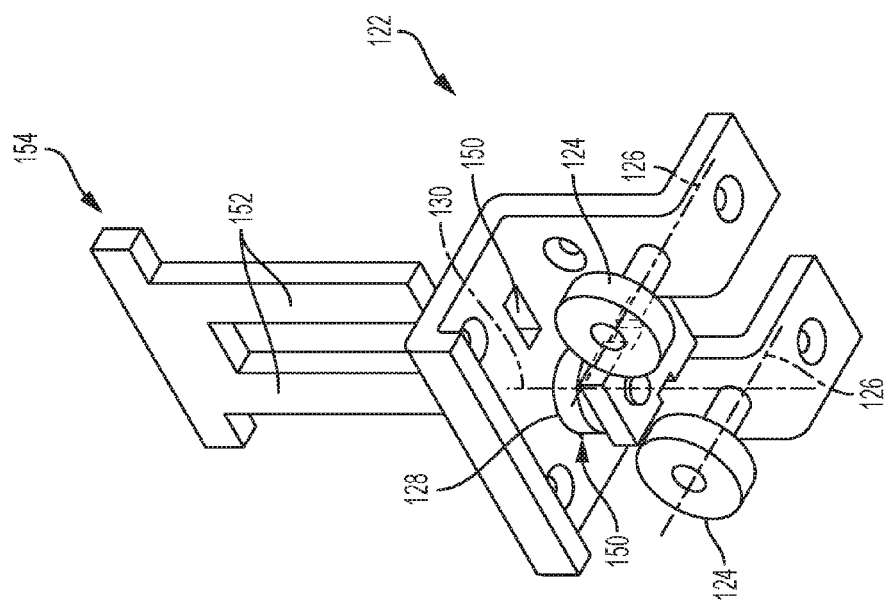
FIG. 3 is a perspective exploded view of a roller assembly of the system of FIG. 1 in accordance with an exemplary embodiment of the invention.

Referring now to FIGS. 2 and 3, detailed views of the system 100 illustrate an exemplary embodiment of elements that may be employed to support the front end 106 of the rack assembly 104. A roller assembly 122 may be employed to provide support and to also provide for ease of movement of the front end 106 of the rack assembly 104 on the tracks 108. The roller assembly 122 may include one or more vertical supporting rollers 124 having axes 126 oriented horizontally relative to the roof 116 of the truck 102. The roller assembly 122 may also include at least one horizontal positioning roller 128 having an axis 130 oriented vertically relative to the roof 116 of the truck 102.

In an exemplary embodiment, the track 108 may be incorporated in a hollow housing 131 with a generally semi-circular cross sectional shape. The track 108 may be partially enclosed within the housing 131. The track 108 may include a bottom segment 134 that may be oriented substantially parallel to the roof 116 of the truck 102. A guide segment 136 of the track 108 may extend vertically from the bottom segment 134 and may be oriented substantially orthogonally to the roof 116 of the truck 102. A cover segment 138 of the track 108 may extend horizontally from vertical guide segment 136 and may provide a protective covering over the roller assembly 122.

One of the roller assemblies 122 may be attached to each side of the front end 106 of the rack assembly 104. In operation, the rollers 124 may rest on an inner surface of the bottom segment 134. The horizontal positioning roller may bear against an inner surface of the guide segment 136.

Figure 4:
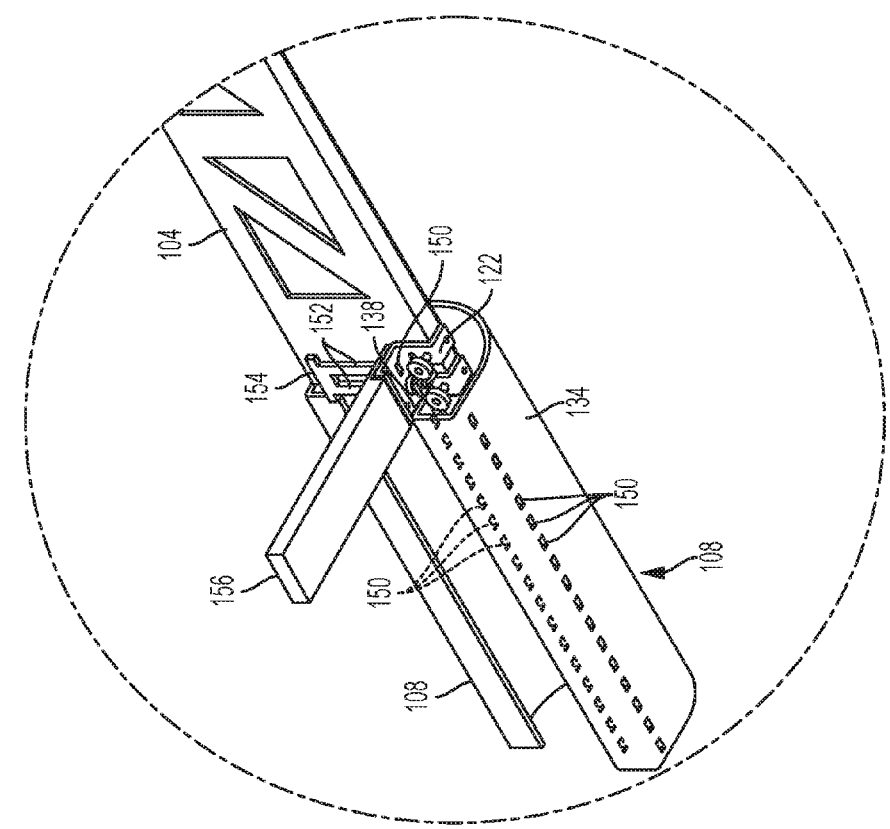
FIG. 4 is a detailed perspective view of a portion of the system of FIG. 1 accordance with an exemplary embodiment of the invention.

Referring now to FIGS. 3 and 4, detailed views of portions of the system 100 illustrate an exemplary embodiment of elements that may be employed to support the rear end 110 of the rack assembly 104. Roller assemblies 122 may be employed to provide support and to also provide for ease of movement of the support legs 112 on the tracks 118 (See FIG. 1).

In an exemplary embodiment the track 118 may include a bottom segment 140 that may be attached to the bed rail 120 of the truck 102. The track 118 may be oriented substantially parallel to the bed wall 120 of the truck 102. A guide segment 142 may extend vertically from the bottom segment 140 and may be oriented substantially orthogonally to the bed wall 120 of the truck 102. A cover segment 144 may extend horizontally from the guide segment 142 and may provide a protective covering over the roller assembly 122.

The support leg 112 may include an attachment segment 146 at its lower end. The attachment segment 146 may be configured to fit around the bracket 123 of the roller assembly 122.

Figure 5:
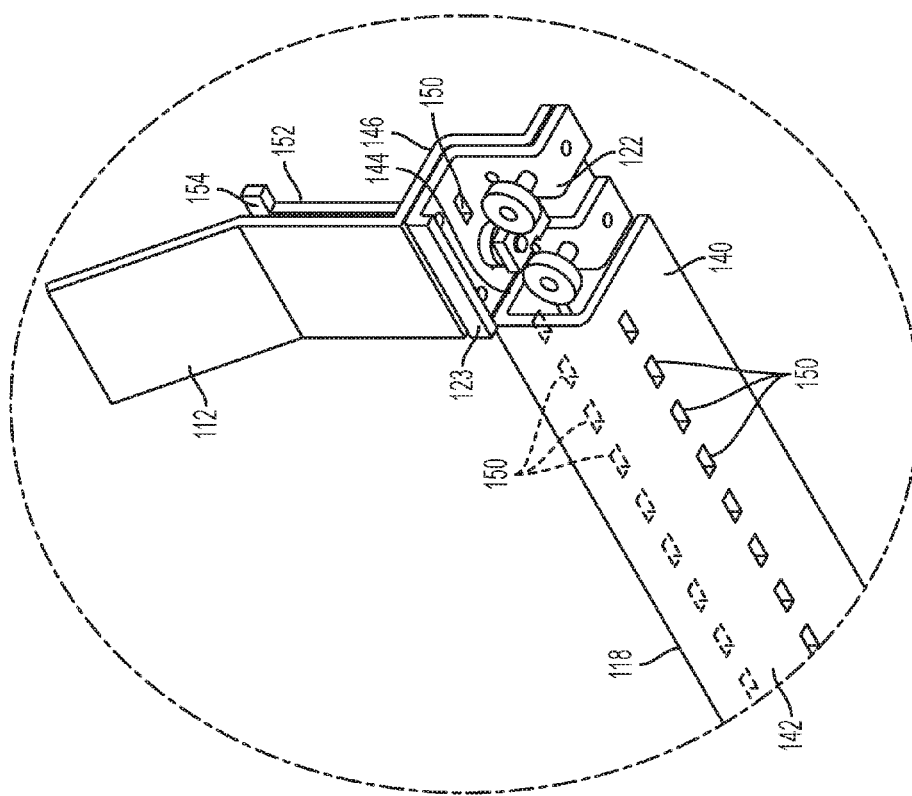
FIG. 5 is a detailed perspective view of a portion of the system of FIG. 1 accordance with an exemplary embodiment of the invention.

Referring now to FIGS. 4 and 5, there is illustrated an exemplary embodiment of a locking system for securing the rack assembly 104 in a desired position relative to the axis 114 of the truck 102. As shown in FIG. 4, the cover segment 144 and bottom segment 140 of the support track 118 may include a plurality of equally spaced slots or locking holes 150. The holes 150 may have a shape that substantially corresponds to a shape of legs 152 of a locking device 154 corresponds to spacing between the legs 152. The legs 152 may shaped and spaced apart from one another to fit through the locking holes 150 of the roller bracket 123 and into any pair of adjacent ones of the locking holes 150 of the track 118.

The brackets 123 of the roller assemblies 122 and the attachment segments 146 of the support legs 112 may each be provided with a pair of the holes 150. Thus the legs 152 of the locking device 154 may be inserted through one of the brackets 123, through one of the attachments segments 146 and into any pair of two adjacent ones of the holes 150 in the top segment 144 and the bottom segment 140 of the track 118. When the locking device 154 is so inserted, the rack assembly 104 may be constrained from moving longitudinally with respect to the axis 114 of the truck 102.

Referring now to FIG. 5, it may be seen that the front end 106 of the rack assembly 104 may be locked into a desired longitudinal position. In that case the locking devices 154 may engage with holes 150 in the top segment 138 and bottom segments 134 of the track 108.

Referring back now to FIG. 2, it may be seen that in an exemplary embodiment, there may be clearance space 158 between the cover segment 138 of the support channel 108 and the bracket 123 of the roller assembly 122. It may also be seen that the cross member 156 may be attached to the bracket 123. Consequently, the cross member 156 may be free to move longitudinally as the rack assembly 104 is moved longitudinally. This feature allows for permanent attachment of the cross member to the rack assembly 104. Thus there is no need to remove and store the cross member 156 when the rack assembly 104 is in a fully retracted position over the roof 116 of the truck 102. Moreover, the cross member 156 may be utilized as an intermediate support for roof-top loads when the rack assembly 104 may be in a partially retracted position such as the position illustrated in FIG. 1.

It should be understood, of course, that the foregoing relates to exemplary embodiments of the invention and that modifications may be made without departing from the spirit and scope of the invention as set forth in the following claims.

We claim:

1. An extendable rack system for a vehicle comprising:
   a rack assembly having a first supporting roller and a second supporting roller;
   a first track configured to be mounted on a roof of the vehicle; and
   a second track configured to be mounted on a side wall of a bed of the vehicle,
   wherein the first supporting roller is positioned for engagement with the first track after the first track is mounted on the roof,
   wherein the second supporting roller is positioned for engagement with the second track after the second track is mounted on the side wall;
   wherein the rack assembly further includes:
      a side member configured to be positioned above the roof with an orientation substantially parallel to the roof and parallel to a longitudinal axis of the vehicle;
      a roller bracket interposed between the first supporting roller and the side member;
   wherein the first track has locking holes spaced equidistantly along its length; and
   wherein the roller bracket has locking holes, corresponding in shape and spacing to any pair of adjacent ones of the locking holes of the first track.

2. The system of claim 1:
wherein the rack assembly includes two of the first supporting rollers and two of the second supporting rollers;
wherein two of the first tracks are configured to be mounted on the roof of the vehicle; and
wherein one of the second tracks is configured to be mounted on each of two side walls of the bed of the vehicle.

3. The system of claim 1 further comprising:
a locking device having two legs; and
wherein the legs are shaped spaced apart from one another so that they fit through the locking holes of the roller bracket and into locking holes of the first track.

4. The system of claim 1 wherein the rack assembly further comprises:
a supporting leg configured to be positioned above the bed rail of the truck and oriented substantially vertically relative to the bed wall;
a roller bracket interposed between the second supporting roller and the supporting leg;
wherein the second track has locking holes spaced equidistantly along its length;
wherein the roller bracket has locking holes, corresponding in shape and spacing to any pair of the locking holes of the second track.

5. The system of claim 4 further comprising:
a locking device having two legs; and
wherein the legs are shaped spaced apart from one another so that they fit through the locking holes of the roller bracket and into locking holes of the second track.

6. The system of claim 4 wherein the rack assembly further comprises:
a side member configured to be positioned above the roof with a horizontal orientation relative to the roof;
one of the roller brackets is interposed between the first supporting roller and the side member;
wherein the first track has locking holes spaced equidistantly along its length;
wherein the roller bracket has locking holes, corresponding in shape and spacing to any pair of the locking holes of the first track; and
wherein the legs are shaped and spaced apart from one another to fit through the locking holes of the roller bracket and into any two of the locking holes of the first and the second track.

7. A material supporting system for a pick-up truck, comprising:
a platform which includes:
side members oriented parallel to one another; and
cross-members interposed between the side members;
first roller assemblies attached to first ends of the side members;
support legs attached to second ends, opposite the first ends, of the side members;
second roller assemblies attached to the support legs;
first tracks for mounting on a roof of the pick-up truck and for supporting the first roller assemblies; and
second tracks for mounting on side walls of a bed of the pick-up truck and for supporting the second roller assemblies; and
wherein the first tracks include hollow housings with interiors large enough to enclose one of the side members.

8. The system of claim 7 wherein the hollow housings of the first tracks have a substantially semi-circular cross-sectional shape.

9. The system of claim 7:
wherein the first tracks have locking holes spaced equidistantly along their respective length; and
wherein the first roller assemblies have roller brackets with locking holes, corresponding in shape and spacing to any pair of the locking holes of the first tracks.

10. The system of claim 7:
wherein the second tracks have locking holes spaced equidistantly along their respective length; and
wherein the second roller assemblies have roller brackets with locking holes, corresponding in shape and spacing to any pair of the locking holes of the second tracks.

11. The system of claim 7:
wherein the first and the second tracks have locking holes spaced equidistantly along their respective length; and
wherein all of the roller assemblies have roller brackets with locking holes, corresponding in shape and spacing to any pair of the locking holes of the first and the second track.

* * * * *